(12) United States Patent
Ames

(10) Patent No.: US 9,267,958 B2
(45) Date of Patent: Feb. 23, 2016

(54) THERMALLY BALANCED DIFFERENTIAL ACCELEROMETER

(71) Applicant: Blue Line Engineering Company, Colorado Springs, CO (US)

(72) Inventor: Gregory H. Ames, Colorado Springs, CO (US)

(73) Assignee: Blue Line Engineering Company, Colorado Springs, CO (US)

( * ) Notice: Subject to any disclaimer, the term of this patent is extended or adjusted under 35 U.S.C. 154(b) by 0 days.

(21) Appl. No.: 14/572,414

(22) Filed: Dec. 16, 2014

(65) Prior Publication Data

US 2015/0204896 A1 Jul. 23, 2015

Related U.S. Application Data

(60) Provisional application No. 61/917,202, filed on Dec. 17, 2013.

(51) Int. Cl.
*G01P 15/02* (2013.01)
*G01P 15/08* (2006.01)
*G01P 1/00* (2006.01)

(52) U.S. Cl.
CPC ............. *G01P 1/006* (2013.01); *G01P 15/02* (2013.01)

(58) Field of Classification Search
CPC ............ G01P 15/02; G01P 1/00; G01P 15/08
USPC ............................................. 73/497
See application file for complete search history.

(56) References Cited

U.S. PATENT DOCUMENTS

2009/0114031 A1* 5/2009 Maguire ................. G01P 15/08
73/760

* cited by examiner

*Primary Examiner* — Lisa Caputo
*Assistant Examiner* — Jamel Williams
(74) *Attorney, Agent, or Firm* — Martensen IP

(57) ABSTRACT

A single sensing unit having two electrodes with a common thermal reference is positioned near the centroid of the inertial mass of a differential inductive accelerometer. As the mass is displaced a first sensor detects an increase in inductance while a second sensor detects a decrease in inductance. Significantly, the first and second sensors share a common thermal reference eliminating any thermal differential. As the sensor system is closely aligned with the centroid of the inertial mass the sensor system of the present invention reduces or eliminates any systemic error.

21 Claims, 3 Drawing Sheets

THERMALLY BALANCED DIFFERENTIAL ACCELEROMETER

RELATED APPLICATION

The present application relates to and claims the benefit of priority to U.S. Provisional Patent Application No. 61/917,202 filed Dec. 17, 2013 which is hereby incorporated by reference in its entirety for all purposes as if fully set forth herein.

BACKGROUND OF THE INVENTION

1. Field of the Invention

Embodiments of the present invention relate, in general, to accelerometers, and more particularly to a thermally balanced differential accelerometer.

2. Relevant Background

Accelerometers are widely used in many different application areas such as geophysical surveying, imagery, navigation, medicine, automotive, aerospace, consumer electronics and the like. These sensors detect acceleration using a fundamental application of Newton's Second Law of Motion, Force (F) is equal to Mass (m) multiplied by Acceleration (a) (F=Ma). Early accelerometer mechanisms were comprised of little more than an internal mass (m), a system that suspends the mass along an axis of interest (a sensitivity axis) and a pointer with a graduated scale to read out acceleration, typically in units of gravity (g). As the mass accelerates along the axis of sensitivity the springs are displaced. When one knows the mass of the object and the force exhibited by the displacement of the springs, he or she can determine the acceleration of the mass.

Although it has been refined and miniaturized this fundamental arrangement is still used in many of today's most advanced accelerometers. This is true even for the most widely produced class of accelerometers that are based on MicroElectroMechanical Systems (MEMS) technologies. Accelerometers of this type are used in consumer products ranging from automobiles to the latest generations of hand held telephones.

MEMS are separate and distinct from the hypothetical vision of molecular nanotechnology or molecular electronics. MEMS are made up of components that are between 1 to 100 micrometers in size (i.e. 0.001 to 0.1 mm). MEMS devices generally range in size from 20 micrometers (20 millionths of a meter) to a millimeter (i.e. 0.02 to 1.0 mm). They usually consist of a central unit that processes data (the microprocessor) and several components that interact with the surroundings such as micro-sensors. At these size scales, the standard constructs of classical physics are not always useful. For example, because MEMS have a large surface area to volume ratio, surface effects (such as electrostatics and wetting) are more dominant than volume effects (such as inertia or thermal mass).

In a typical MEMS accelerometer, as would be known to one of reasonable skill in the relevant art, the main the systems use some sort of pick-off sensor to produce an electronic signal that is proportional to acceleration. A typical arrangement of the most modern devices, such as the 3-axis accelerometer, is shown in FIG. 1. These sensors typically detect acceleration by measuring a change of position of a proof mass, for example, by a change in the associate capacitance.

In the device depicted in FIG. 1 the stationary fingers 110 are actually long thin beams used to sense the motion of the inertial mass 120 through changes in capacitance. The inertial mass 120 is suspended from a substrate by a plurality of anchors 140 using flexible legs or arms 145. As the inertial mass is displaced, one can determine the force to deform the flexible legs 145 and thereafter determined the acceleration. In this example, this displacement is measured by variance in capacitance. Each stationary finger 110 forms one plate of a variable capacitor, while the nearest protruding fingers 130 from the inertial mass 120 forms the other plate. The net capacitance for a given stationary finger is a function of the area of overlap of the two plates and the separation distance between them. For a typical MEMS type accelerometer this equates to approximately 2×10-15 farads. Therefore, in order to achieve a practical amount of capacitance it is necessary to have around forty stationary fingers arranged along each side of the inertial mass.

Measurement noise and range may vary for different applications of such sensors. Most accelerometers do not perform well at very low levels of acceleration as they are limited by inherent noise and drift in their electronics. However, as refinements occur in the ability to control and compensate noise and electronic drift, the normal inconsequential physical limitations and effects begin to dominate performance. The MEMS physical arrangement of the position sensor and inertial mass of accelerometers of the prior art typically neglects small-scale sources of error, such as thermal gradients and they lack any sort of thermal-reference plane. As a result, there are no known MEMS capacitance type accelerometers that can achieve thermal stability. One or more embodiments of the present invention address these and other deficiencies of the prior art.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A system for a thermally balanced differential accelerometer is hereafter disclosed whereby the position sensors are not only substantially aligned with the sensitivity axis but also share a common thermal reference. In one embodiment of the present invention, the system includes a housing with a sensitivity axis suitable for housing an inertial mass. The internal mass is mounted within the housing using a deformable support structure so that it can move along the sensitivity axis. The system also includes a differential position sensor, apart from the inertial mass that is also connected to the housing. The differential position sensor must not make any physical contact with the inertial mass but it is based on any general operating principle such as inductive, capacitive, or electro-optical sensor technologies. Both sensing elements of the differential position sensor are connected to the housing through a common thermal and mechanical reference.

Another aspect of the thermally balanced differential accelerometer of the present invention is that the centroid of the inertial mass and the measurement axis of the differential position sensor are substantially aligned with the axis of motion of the inertial mass. Indeed when the housing is at rest, the centroid of the inertial mass and that of the sensor coincide on the sensitivity axis.

The sensor of the present invention is located within an area of the inertial mass that is void of matter. In one embodiment of this invention the inertial mass has a small void at its center that is large enough to accept a back-to-back arrangement of the differential position sensing elements. As the spring or flexural element that supports the inertial mass compresses along the sensitivity axis, one portion of the inertial mass is displaced closer to the sensor, while another portion of the inertial mass is displaced further from the sensor. In each case the differential position sensor measures the deflection of the inertial mass. The force needed to deform the deformable structure, which results in the movement of the inertial mass, is proportional to the change in position of the inertial mass.

Unlike prior designs the sensor elements are connected to a common thermal and mechanical reference. This design eliminates any form of thermal distortion between the sensors that results in error.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Accelerometers have broad commercial applications. The ability of MEMS accelerometers to provide meaningful data with respect to an object's motion has lead to wide acceptance of the technology and an increasing desire for improved accuracy and efficiency. Accelerometers come in a variety of designs including piezoelectric, peizoresistive, capacitive, resonance, optical, and magnetic. For applications that require inertial sensing capacitive micro-machined accelerometers offer good DC response, excellent noise performance, high sensitivity and low drift characteristics.

Figure 1:
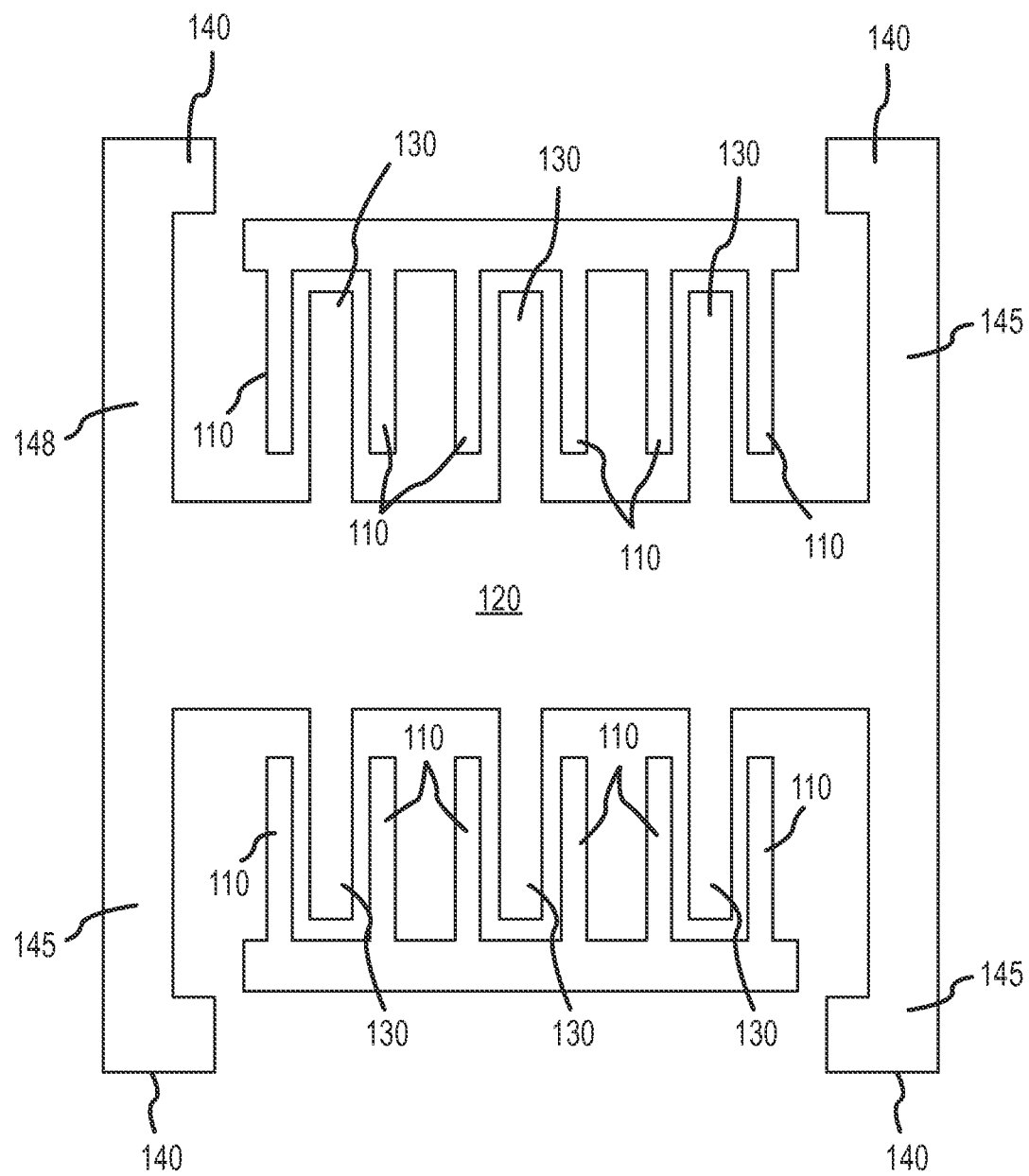
FIG. 1 shows high level inertial mass accelerometer as would be known in the prior art.

Despite the variety of employed detection schemes, every accelerometer can be modeled as a mass-spring damper system similar to that shown in FIG. 1. In inductive accelerometers, the deflection of the mass is detected by the change of inductance that results when the distance between the sensing coil and the surface of a metal object—such as the inertial mass—changes. Generally a differential inductive sensing scheme is used to linearize the output and to compensate for drifts and interferences in the detection of the very small deflections. By forming two variable inductor surfaces a differential inductive bridge is created wherein the deflection results in inductance increase in one sensor coil and an inductance decrease in the other. Normally, electrodes are placed in proximity to the exterior of the mass in order to register movement. However, such a design can create a thermal differential between the two electrodes. For example, consider a case in which a differential inductive bridge uses one inductor to measure an inductance decrease and another to measure an inductance increase. The placement of the two opposing inductor plates can results in a thermal differential. This means that one inductor plate is subjected to differential thermal conditions than the other. As a result even minute thermal differences can result in significant variances in the mechanical properties of the plate. For instance, consider two plates that are comprised of the same material and have nearly identical dimensions. If they possess a thermal differential (meaning the temperature of the plates differs), they will experience different absolute variances in inductance for the same degree of motion.

According to one embodiment of the present invention, a single sensing unit that has two electrodes with a common thermal reference is positioned near the centroid of the inertial mass. As the mass is displaced, a first sensor detects an increase in inductance, while a second sensor detects a decrease in inductance. It is significant to note that the first and second sensors share a common thermal reference that eliminates any thermal differential. Furthermore, because the sensor system is closely aligned with the centroid of the inertial mass, the sensor system of the present invention reduces or eliminates any systemic error. In prior designs, the supporting structure's differences in thermal expansion and contraction make it difficult to determine a true and accurate position of the electrodes. Consequently, there are errors in detecting any movement of the inertial mass. One or more embodiments of the present invention eradicate these errors.

Embodiments of the present invention are hereafter described in detail with reference to the accompanying Figures. Although the invention has been described and illustrated with a certain degree of particularity, it is understood that the present disclosure has been made only by way of example and that those skilled in the art can resort to numerous changes in the combination and arrangement of parts without departing from the spirit and scope of the invention.

The following description with reference to the accompanying drawings, is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including, for example, tolerances, measurement error, measurement accuracy limitations, and other factors known to those of skill in the art, may occur in amounts that do not preclude the effect the characteristic was intended to provide.

Like numbers refer to like elements throughout. In the figures, the sizes of certain lines, layers, components, elements, or features may be exaggerated for clarity.

The terminology used herein is for the purpose of describing particular embodiments only and is not intended to be limiting of the invention. As used herein, the singular forms "a," "an," and "the" are intended to include the plural forms as well, unless the context clearly indicates otherwise. Thus, for example, reference to "a component surface" includes reference to one or more of such surfaces.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Figure 2:
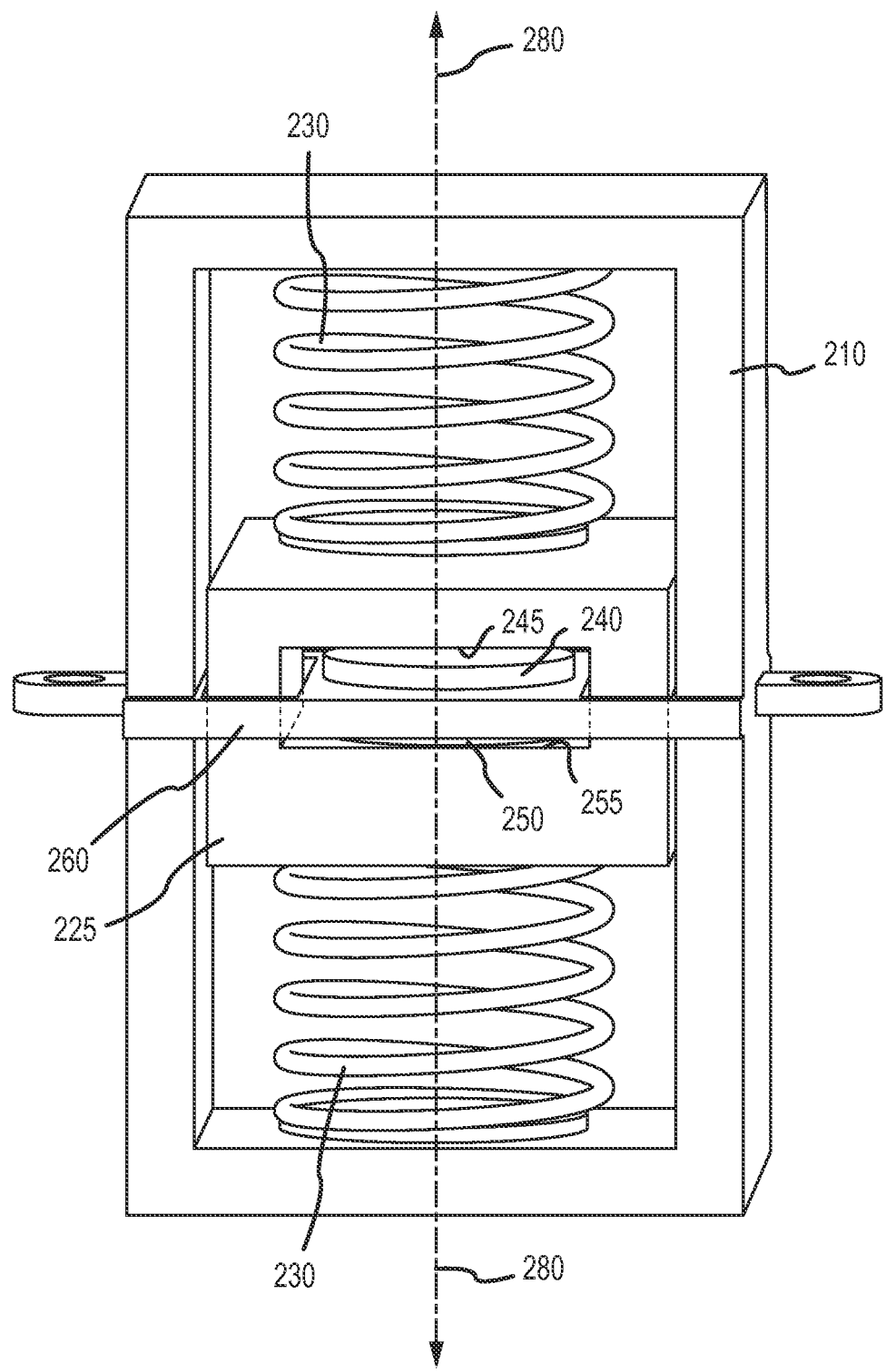
FIG. 2 shows a perspective functional view of a thermally balanced differential inductive accelerometer according to one embodiment of the present invention.

FIG. 2 shows a perspective view of a high-level depiction of a thermally balanced differential MEMS accelerometer according to one embodiment of the present invention. In this exemplary embodiment, an inertial mass 220 is suspended within a frame 210 by one ore more flexible members 230. The inertial mass 220 is interposed between and connected to two springs 230 providing the inertial mass 220 with the ability to translate along the axis of interest 280. For example, as the frame 210 accelerates upward, the mass 220 will tend to remain stationary, compressing the lower spring 230 and stretching the upper springs 230. While FIG. 2 presents the inertial mass 220 interposed between two springs 230 one of reasonable skill in the relevant art will recognize other mechanisms and configurations are equally applicable and so contemplated to provide the inertial mass with the ability to move along the axis of interest 280 as a result of an acceleration force.

Those of skill in the art will also appreciate additional alternative structural and functional designs for a thermally balanced differential accelerometer through the disclosed principles herein. Thus, while particular embodiments and applications are illustrated and described herein, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein without departing from the spirit and scope defined in the appended claims.

Referring again to the sensor shown in FIG. 2, according to one embodiment of the present invention, the internal mass 220 includes a region 225 void of material surrounding the inertial mass' centroid and center of mass. Positioned within this area void of material 225 is a sensor system connected to the frame 210 by a support structure 260. The support structure 260 extends, in this embodiment, laterally from the frame 210 without interfering with the movement of the inertial mass 220 along the axis of interest 280. The support structure 260 extends within the void area 225 so as to position an upper sensor 240 on the top surface of the support structure 260. This upper sensor 240 is opposite to and proximate with a lower internal surface 245 of the inertial mass 225. A lower sensor 250 that is on the bottom surface of the support structure 260, is opposite to and proximate with an upper internal surface 255 of the inertial mass.

As the frame 210 is accelerated along the axis of interest 280 the inertial mass tends to remain at rest. Thus, for example, when the frame 210 is accelerated towards the top of the page, the inertial mass 220 will oppose the acceleration and stretch the upper spring or flexible support member 230 while the lower spring 230 is compressed. This displacement will remain in effect as long as the acceleration is maintained.

As the support structure 260 is rigidly connected to the frame 210, the position of the sensor system will shift within the area void of material 225 relative to the inertial mass 220 as the inertial mass 220 moves. In this example, the upper sensor 240 will come closer to the lower internal surface of the inertial mass 220 while the lower sensor will become more distant from the upper internal surface. The changes in distances from the sensors will result in a measurable differential inductance that can be used to determine the extent of the displacement.

When one knows the force necessary to deflect the springs 230 and the mass of the inertial mass 220, one can determine the acceleration force along the axis of interest 280 causing the displacement. It is significant to note that the upper sensor 240 and lower sensor 250 are connected to the same support structure 260 and have the same thermal properties. This configuration of sensors with respect to the inertial mass eliminates any thermal differential between the inductance sensors.

Figure 3:
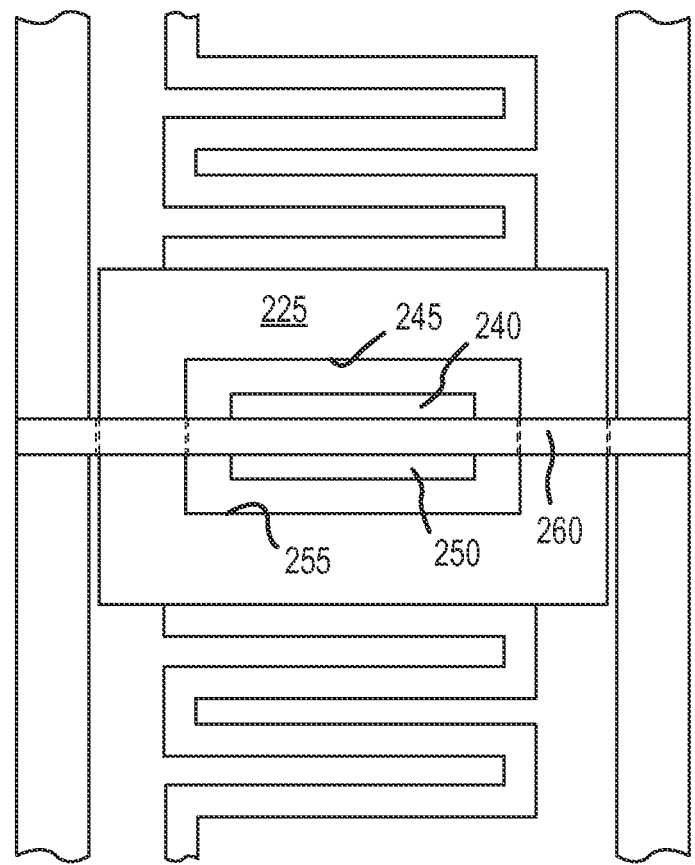
FIG. 3 is a front view of the thermally balanced differential inductive accelerometer according to one embodiment of the present invention.

FIG. 3 is a front view of the thermally balanced inductive accelerometer according to one embodiment of the present invention. The view shown in FIG. 3 identifies the gap between the upper sensor 240 as well as the lower facing internal surface 245 of the inertial mass 225 and the lower sensor 250 and the upper facing internal surface 255 of the inertial mass 225. The sensors 240, 250 are commonly connected to the support structure 260. The common connectivity provides each sensor with the same thermal reference. Moreover the centroids of the sensors 240, 250 are aligned with the centroid of the inertial mass 225. This essentially eliminates any systemic errors due to offset.

As the entire housing 210 accelerates along the axis of sensitivity 280, the inertial mass will tend to remain in its original location and displace the inertial mass 225 relative to the housing 210. Upon displacement, due to the stretching and compression of the deformable structure 230, the gaps between the sensors 240, 250 and the internal surfaces 245, 255 (respectively) of the inertial mass 225 will cause a change in inductance. The variance in the inductance is related to the displacement and can in turn be used to calculate the acceleration of the housing.

In another embodiment of the present invention, the centroids of the sensors used to detect variances in inductance are positioned to be on or near the translational axis of the inertial mass reducing or eliminating systemic errors. The inertial mass will move along a translational axis parallel to the axis of interest. The present invention positions the centroid of the sensor system as close as possible to the translational axis while using a common thermodynamic reference. In this case the same structural member supports the two sensors that measure the differential inductance. The alignment with the inertial mass' translational axis and the common thermal reference significantly reduces or eliminates systemic error.

While the principles of the present invention have been described above, in conjunction with a thermally balanced differential accelerometer, it is to be clearly understood that the foregoing description is made only by way of example and not as a limitation to the scope of the invention. Particularly, it is recognized that the teachings of the foregoing disclosure will suggest other modifications to those persons skilled in the relevant art such as the use of inductive position sensors to measure the motion of the inertial mass. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. An accelerometer, comprising:
a housing configured to have a sensitivity axis;
an inertial mass having a first center of mass on the sensitivity axis;
a deformable support structure connecting the inertial mass to the housing and configured to provide the inertial mass mobility along the sensitivity axis;
a sensor, apart from the inertial mass, having a second center of mass on the sensitivity axis and connected to the housing wherein the sensor is configured to detect a change in position of the inertial mass along the sensitivity axis.

2. The accelerometer according to claim 1, wherein the sensor includes a first coil and a second coil and wherein the first coil is positioned proximate to the inertial mass to form a first inductor and the second coil if positioned proximate to the inertial mass to form a second inductor and wherein movement of the inertial mass along the sensitivity axis is measured by variances in inductance of the first inductor and the second inductor.

3. The accelerometer according to claim 2, where the first sensor coil and the second sensor coil share a common thermal reference.

4. The accelerometer according to claim 1, wherein responsive to the housing accelerating along the sensitivity axis the first center of mass of the inertial mass changes position on the sensitivity axis.

5. The accelerometer according to claim 1, wherein when the housing is at rest the first center of mass and the second center of mass coincide on the sensitivity axis.

6. The accelerometer according to claim 1, wherein the first center of mass is located at a centroid of the inertial mass.

7. The accelerometer according to claim 1, wherein the second center of mass is located at a centroid of the sensor.

8. The accelerometer according to claim 1, wherein the first center of mass of the inertial mass is located at an area void of material.

9. The accelerometer according to claim 8, wherein the sensor is positioned within the inertial mass and in the area void of material.

10. The accelerometer according to claim 1, wherein the sensor is symmetrical and oriented to detect changes of position of the internal mass along the sensitivity axis.

11. The accelerometer according to claim 1, wherein the inertial mass is interposed between a first deformable support structure and a second deformable support structure.

12. The accelerometer according to claim 1, wherein the deformable structure is configured to deform along the sensitivity axis.

13. The accelerometer according to claim 1, wherein the deformable structure is elastically deformable.

14. The accelerometer according to claim 1, wherein a force to deform the deformable structure is proportional to the change in position of the inertial mass.

15. The accelerometer according to claim 1, wherein the sensor detects changes in inductance between the sensor and the inertial mass due to movement of the inertial mass relative to the housing.

16. A thermally balanced accelerometer, comprising:
a housing;
an inertial mass, having a center of mass, suspended from the housing for movement along an axis in response to an applied acceleration component;
a sensor, having a centroid, fixedly connected to the housing and configured to detect change in position of the inertial mass along the axis wherein responsive to the housing being at rest the centroid of the sensor and center of mass of the inertial mass coincide on the axis.

17. The thermally balanced accelerometer according to claim 16, wherein the inertial mass includes a central region void of material and wherein the sensor is positioned within the central region.

18. The thermally balanced accelerometer according to claim 16, wherein the sensor measures change in inductance responsive to movement of the inertial mass.

19. The thermally balanced accelerometer according to claim 16, wherein the inertial mass is interposed between a first deformable support structure and a second deformable support structure.

20. An accelerometer according to claim 16, wherein the sensor includes a first coil positioned proximate to the inertial mass to form a first inductor and a second coil positioned proximate to the inertial mass to form a second inductor and wherein movement of the inertial mass along the axis is measured by variances in inductance of the first inductor and the second inductor.

21. The accelerometer according to claim 2, where the first sensor coil and the second sensor coil share a common thermal reference.

\* \* \* \* \*